United States Patent
Cordeiro et al.

(10) Patent No.: US 9,107,221 B2
(45) Date of Patent: Aug. 11, 2015

(54) CONFIGURABLE CONTENTION-BASED PERIOD IN MMWAVE WIRELESS SYSTEMS

(75) Inventors: Carlos Cordeiro, Portland, OR (US); Solomon Trainin, Haifa (IL)

(73) Assignee: Intel Corporation, Santa Clara, CA (US)

(*) Notice: Subject to any disclaimer, the term of this patent is extended or adjusted under 35 U.S.C. 154(b) by 470 days.

(21) Appl. No.: 12/586,706

(22) Filed: Sep. 25, 2009

(65) Prior Publication Data
US 2011/0075642 A1 Mar. 31, 2011

(51) Int. Cl.
H04W 4/00 (2009.01)
H04W 74/08 (2009.01)

(52) U.S. Cl.
CPC ................ *H04W 74/0816* (2013.01)

(58) Field of Classification Search
CPC .................................. H04W 74/0816
USPC .................................. 370/338, 445
See application file for complete search history.

(56) References Cited

U.S. PATENT DOCUMENTS

| | | | |
|---|---|---|---|
| 6,154,450 A * | 11/2000 | Wallentin et al. | 370/311 |
| 6,816,726 B2 * | 11/2004 | Lysejko et al. | 455/414.1 |
| 2004/0076171 A1 | 4/2004 | Levi et al. | |
| 2004/0100986 A1 * | 5/2004 | Lee et al. | 370/443 |
| 2005/0105535 A1 * | 5/2005 | Aaltonen et al. | 370/395.52 |
| 2006/0007907 A1 * | 1/2006 | Shao et al. | 370/347 |
| 2007/0274206 A1 * | 11/2007 | Habetha et al. | 370/222 |
| 2007/0280157 A1 | 12/2007 | Kwon et al. | |
| 2008/0037465 A1 * | 2/2008 | Ngo et al. | 370/329 |
| 2008/0037466 A1 * | 2/2008 | Ngo et al. | 370/329 |
| 2008/0310348 A1 * | 12/2008 | Nandagopalan et al. | 370/328 |
| 2009/0011782 A1 * | 1/2009 | Yonge et al. | 455/502 |
| 2009/0067389 A1 * | 3/2009 | Lee et al. | 370/336 |
| 2009/0109938 A1 * | 4/2009 | Singh et al. | 370/337 |
| 2009/0168744 A1 | 7/2009 | Park | |
| 2009/0232106 A1 | 9/2009 | Cordeiro et al. | |
| 2009/0279487 A1 * | 11/2009 | Reumerman et al. | 370/329 |
| 2009/0323715 A1 * | 12/2009 | Levi et al. | 370/458 |
| 2010/0002627 A1 * | 1/2010 | Ngo et al. | 370/328 |
| 2010/0111215 A1 * | 5/2010 | Nandagopalan et al. | 375/267 |
| 2010/0157955 A1 * | 6/2010 | Liu et al. | 370/336 |
| 2010/0220690 A1 * | 9/2010 | Majkowski et al. | 370/336 |
| 2010/0260064 A1 * | 10/2010 | Garg et al. | 370/254 |
| 2010/0260085 A1 * | 10/2010 | Wang et al. | 370/311 |

(Continued)

FOREIGN PATENT DOCUMENTS

CN 101438584 A 5/2009
JP 2008-259237 A 10/2008

(Continued)

OTHER PUBLICATIONS

International Search Report and Written Opinion received for PCT Patent Application No. PCT/US2010/046624, mailed on Apr. 29, 2011, 10 pages.

(Continued)

*Primary Examiner* — Shripal Khajuria
*Assistant Examiner* — Faisal Choudhury
(74) *Attorney, Agent, or Firm* — Forefront IP Lawgroup, PLLC

(57) ABSTRACT

Embodiments of systems and methods for implementing a contention-based period with configurable parameters such as slot size, and minimum and maximum contention windows in a wireless network are generally described herein. Other embodiments may be described and claimed.

16 Claims, 4 Drawing Sheets

(56) References Cited

U.S. PATENT DOCUMENTS

| | | | |
|---|---|---|---|
| 2010/0278087 A1* | 11/2010 | Kawakami et al. | 370/311 |
| 2010/0315980 A1* | 12/2010 | Chu et al. | 370/310 |
| 2011/0038290 A1* | 2/2011 | Gong et al. | 370/311 |
| 2011/0044303 A1* | 2/2011 | Ji et al. | 370/338 |
| 2011/0070842 A1* | 3/2011 | Kwon et al. | 455/67.13 |
| 2012/0051338 A1* | 3/2012 | Seok | 370/337 |

FOREIGN PATENT DOCUMENTS

| | | |
|---|---|---|
| JP | 2011-514691 A | 5/2011 |
| KR | 10-2008-0057870 A | 6/2008 |
| KR | 10-2009-0061524 A | 6/2009 |
| WO | 2008/149598 A1 | 12/2008 |
| WO | 2009/072089 A1 | 6/2009 |
| WO | 2009/116682 A1 | 9/2009 |
| WO | 2011/037713 A2 | 3/2011 |
| WO | 2011/037713 A3 | 6/2011 |

OTHER PUBLICATIONS

Cordeiro, Carlos, et al., "Channel Synchronization for Wireless Systems", U.S. Appl. No. 12/315,471, filed Dec. 3, 2008.

International Preliminary Report on Patentability received for PCT Application No. PCT/US2010/046624, issued on Mar. 27, 2012, 6 pages.

Office Action received for Chinese patent Application No. 201010506853.4, mailed on Jan. 14, 2013, 5 pages of English Translation, 2 pages of Search Report and 7 pages of Office Action.

Office Action received for Japanese Patent Application No. 2012-530894, mailed on Jun. 25, 2013, 7 pages of English Translation and 6 pages of Office Action.

Cordeiro et al., "Implications of usage models on TGad network architecture", doc.: IEEE 802.11-09/0391r0, Mar. 11, 2009, 11 pages.

Office Action received for Chinese Patent Application No. 201010506853.4, mailed on Sep. 29, 2013, 4 pages of English Translation and 5 pages of Chinese Office Action.

* cited by examiner

CONFIGURABLE CONTENTION-BASED PERIOD IN MMWAVE WIRELESS SYSTEMS

FIELD OF THE INVENTION

The field of invention relates generally to wireless system communication and more specifically but not exclusively relates to a wireless system for transmitting and receiving millimeter-wave (mmWave) signals in WPAN/WLAN environments.

BACKGROUND INFORMATION

Technological developments permit digitization and compression of large amounts of voice, video, imaging, and data information. The need to transfer data between devices in wireless mobile radio communication requires transmission of a data stream in diverse and dynamic environments at a high data rate. Wireless Personal Area Networks (WPAN) communication systems are extensively used for high data exchange between devices over short distances of no more than 10 meters. Current WPAN systems exploit the frequency band in the 2-7 GHz frequency band region and achieve throughputs of up to several hundred Mbps (for Ultra-Wide-Band systems).

The availability of 7 GHz of unlicensed spectrum in the 60 GHz band and the progress in the RF IC semiconductor technologies are pushing the development of the mmWave WPAN and mmWave Wireless Local Area Network (WLAN) systems which will operate in the 60 GHz band and will achieve the throughputs of about several Gbps. Currently a number of standardization groups (Institute for Electronic and Electrical Engineers (IEEE) 802.15.3c, IEEE 802.11ad, Wireless HD SIG, ECMA TG20) are working on the development of the specifications for such mmWave WPAN and WLAN networks. The standards are developed mainly as addendums to the previous WPAN and WLAN standards with the introduction of new PHY layers and also are trying to reuse most of the MAC functionality. However, the modifications to the MAC layer are also required to exploit specific mmWave WPAN and WLAN characteristics.

A communication link operating at 60 GHz is less robust due to the inherent characteristics of high oxygen absorption and significant attenuation through obstructions. In order to satisfy the link budget requirement, directional antennas have been envisioned to be used in creating a mmWave communication link. For initial device discovery, association, and synchronization, the use of omni (or quasi-omni) beacons is typically required.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This application describes techniques for communicating in a wireless network by a station (STA) having a media access control (MAC) layer that transmits data in a beacon interval, comprising a contention-based period, to allow access to the wireless network using a carrier sense multiple access with collision avoidance (CSMA/CA) protocol. In an implementation, the contention-based period comprises a plurality of slots, and a size of each slot in the plurality of slots is configurable.

In various implementations, the STA may be configured for distributed mode or for PCP-centric mode based on a predetermined signal received during a transmit clear to send (TCTS) to self period (TSP). For example, the configuration may be based on whether a bit is set to one or more predetermined values.

BRIEF DESCRIPTION OF THE DRAWINGS

The present invention is illustrated by way of example and not as a limitation in the figures of the accompanying drawings, in which.

DETAILED DESCRIPTION

Figure 1:
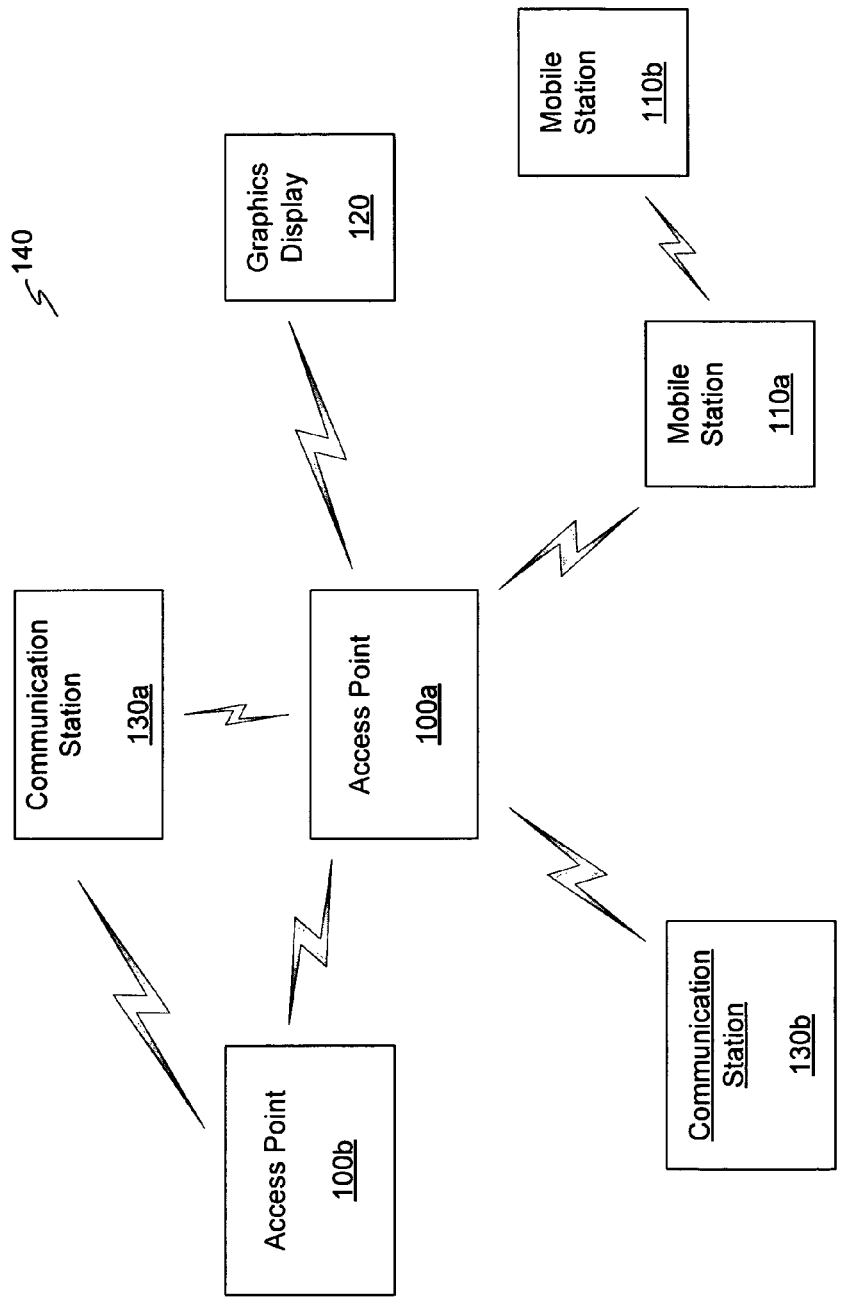
FIG. 1 is a block diagram illustrating devices using extremely high frequency radio signals to communicate in a wireless network according to embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and assemblies have not been described in detail so as not to obscure the present invention.

Embodiments of methods and devices for wireless communication using carrier sense multiple access with collision avoidance (CSMA/CA) periods having heterogeneous parameters such as slots sizes and contention windows are described herein. In the following description, numerous specific details are set forth such as a description of providing flexibility to configure CSMS/CA periods in wireless communication, based at least in-part on a number of devices such as stations (STA) and/or access points (AP) and attributes of those devices, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

It would be an advance in the art to provide a scheduled access protocol for mmWave wireless devices that are designed to operate using local area network (WLAN) and/or wireless personal area network (WPAN) technologies. Existing mmWave communication techniques and devices use media access control (MAC) protocols using CSMA/CA, wherein contention-based channel access is performed during contention-based periods. The contention-based periods in existing mmWave communications system comprise a plurality of slots wherein each slot in the plurality of slots is uniform in size to accommodate a particular type of communication protocol. For example, omni-directional communication by a first STA having a first transmission capability may use a first slot size, while a directional communication by a second STA having a second transmission capability may use a second slot size. Additionally, other CSMA/CA parameters such as minimum and maximum contention windows may also change as a function of communication protocol. Hence, it would be useful to provide a wireless protocol and devices configured to operate using the wireless protocol that enable configurable contention-based periods (CBP) to accommodate a diverse set of protocols and device configurations.

Embodiments of 60 GHz band ((57-66 GHz) mmWave communications devices that provide configurable contention-based periods (CBP) may be used in a variety of applications. Some embodiments of the invention may be used in conjunction with various devices and systems, for example, a transmitter, a receiver, a transceiver, a transmitter-receiver, a wireless communication STA, a wireless communication device, a wireless Access Point (AP), a modem, a wireless modem, a Personal Computer (PC), a desktop computer, a mobile computer, a laptop computer, a notebook computer, a tablet computer, a server computer, a set-top box, a handheld computer, a handheld device, a Personal Digital Assistant (PDA) device, a handheld PDA device, a mobile STA (MS), a graphics display, a communication STA, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11 h, 802.11i, 802.11n, 802.11ac, 802.11ad, 802.16, 802.16d, 802.16e standards and/or future versions and/or derivatives and/or Long Term Evolution (LTE) of the above standards, a Personal Area Network (PAN), a Piconet, a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may also be used in various other apparatuses, devices, systems and/or networks.

Turning now to the figures, FIG. 1 is a block diagram illustrating devices, such as access points (100a & 100b), mobile STAs (110a & 110b), a graphics display (120) and communication STAs (130a & 130b) using extremely high frequency radio signals to communicate in a wireless network 140. Access point 100a may communicate with another access point 100b and communication STAs, such as communication STAs (CS) 130a and 130b. The CSs 130a and 130b may be fixed or substantially fixed devices. In some embodiments, access points 100a may use mmWave signals for communicating, although the scope of the invention is not limited in this respect. Access point 100a may also communicate with other devices such as mobile STA 110a and graphics display 120. In some embodiments, access point 100a and mobile STA 110a operate as part of a peer-to-peer (P2P) network. In other embodiments access point 100a and mobile STA 110a operate as part of a mesh network, in which communications may include packets routed on behalf of other wireless devices of the mesh network, such as mobile STA 110b. Fixed wireless access, wireless local area networks, wireless personal area networks, portable multimedia streaming, and localized networks such as an in-vehicle networks, are some examples of applicable P2P and mesh networks.

Devices such as the access points (100a & 100b), mobile STAs (110a & 110b), graphics display (120) and communication STAs (130a & 130b) having physical layers (PHY) and media access control (MAC) layers operating with a protocol with contention-based periods capable of being dynamically configurable in terms of slot size and minimum/maximum contention windows may communicate using extremely high frequency radio signals transmitted and received over omni-directional and/or directional antenna(s). Communications supporting CSMA/CA as defined in IEEE 802.11 is not applicable since carrier sense is not reliable in the high frequency wireless network 140 where directional antennas may be used. Further, directionality aspects such as collision detection and resynchronization may be difficult to perform in this network 140.

Figure 2:
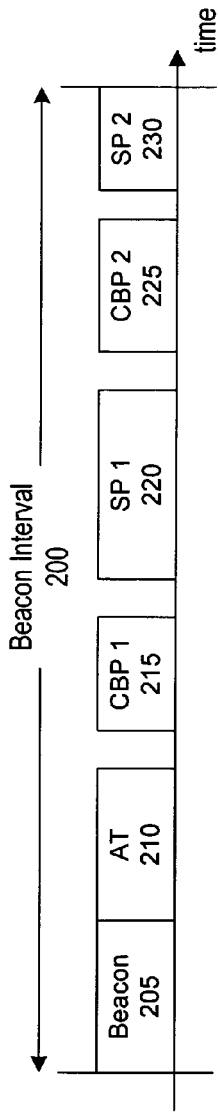
FIG. 2 is an illustration of a beacon interval with contention-based periods and service periods according to embodiments of the present invention.

FIG. 2 is an illustration of a beacon interval 200 with contention-based periods and service periods according to embodiments of the present invention. A wireless network 140 such as a mmWave network may be based on scheduled access, wherein a personal basic service set (PBSS) control point (PCP), similar to an AP, schedules time in a beacon interval (BI) 200 for STAs, such as mobile STAs 110, for communication. The time scheduled in the BI 200 may be allocated to a service period (SP), such as SP1 220 and SP2 230, and a contention-based period, such as CBP1 215 and CBP2 225. A schedule of service periods and contention-based periods in a BI 200 is transmitted in a beacon 205 or announcement time (AT) 210. In this embodiment, the service periods SP1 220 and SP2 230 are owned by a single STA, such as mobile STA 110a, which controls access to the wireless network 140 during the service periods. Alternately, during contention-based periods such as CBP1 215 and CBP2 225, multiple STAs such as mobile STAs 110, access points 100, and communication STAs 130 may contend for access to the wireless network 140.

In an embodiment, a STA such as mobile station 110a having a media access control (MAC) layer may communicate in the wireless network 140 and transmits data in the beacon interval 200. The beacon interval 200 comprises the contention-based period CBP1 215 to allow access to the wireless network through a carrier sense multiple access with collision avoidance (CSMA/CA) protocol. The contention-based period, such as CBP1 215 and/or CBP2 225, comprises a plurality of slots wherein the size of each slot in the plurality of slots is configurable. The STA may serve as a personal basic service set (PBSS) control point (PCP) or access point (AP) 100 to schedule time in the beacon interval 200 for communicating with the STA and wherein scheduling information for the contention-based period is transmitted in the beacon 205 or an AT 210 of the beacon interval 200. Further, the STA may transmit the service period, such as SP1 220 and/or SP2 230 and control access to the wireless network 140 during a duration of the service period.

Figure 3:
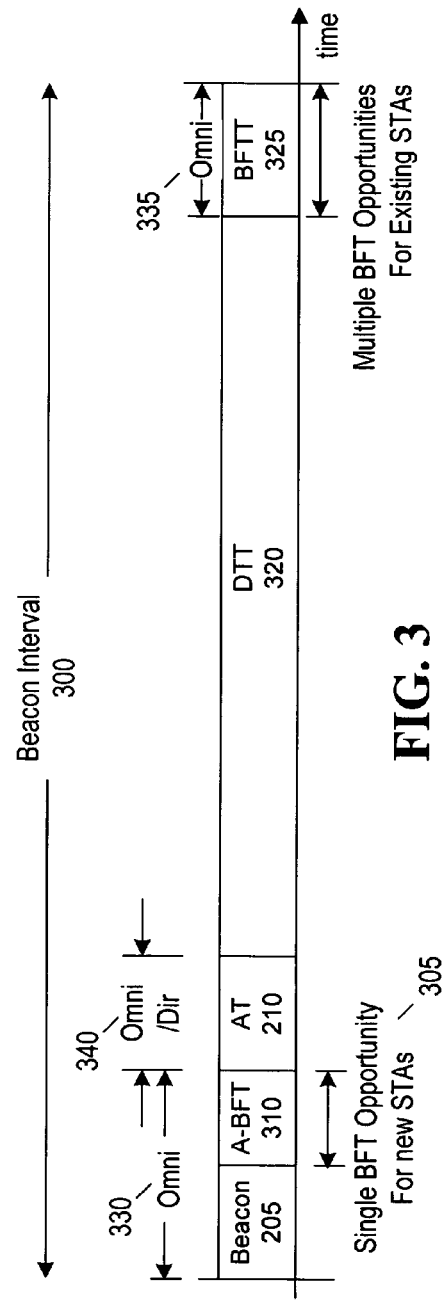
FIG. 3 is an illustration of a Discovery Beacon (DB) transmitted during a Beacon Time (BT), while Announcement Beacons/Frames (ABs) are transmitted during an Announcement Time (AT) according to embodiments of the present invention.

FIG. 3 is an illustration of a Discovery Beacon (DB) transmitted during the Beacon 205, while Announcement Beacons/Frames (ABs) are transmitted during the Announcement Time (AT) 210 over a multiple level (such as two-level) beacon mechanism, consisting of low-rate omni discovery beacons and high-rate directional announcement beacons/frames. Discovery beacons may carry only essential information to enable network entry and initialization, and this may include the transmitter (e.g., MAC address) ID, timing information, association period signaling, etc. Announcement beacons carry full information required for regular network operations, such as channel scheduling, management and security information, etc.

It is critical that the beaconing mechanism in mmWave systems be designed in such a way to maximize efficiency. To accomplish this, embodiments of the present invention provide that multi-level beacons be used. In particular, for mmWave systems an embodiment of the present may provide a two-level beaconing mechanism comprised of two types of beacons:

Discovery beacon (DB): this beacon is transmitted in (a low-rate) omni mode. It allows new STAs to discover and potentially join the network (i.e., PBSS), in addition to serving currently associated STAs. The DB may be a broadcast frame.

Announcement beacon/frames (AB): this beacon/frame is transmitted in (a high-rate) beamformed mode. This frame/beacon may be transmitted by, say, the PCP and targets PBSS STAs that are beamformed with the PCP and may be already associated. The AB is a unicast frame addressed to a particular STA and may require the receiving STA to transmit back another frame in response to the reception of the AB frame.

An additional embodiment of a beacon interval 300 is illlustrated in FIG. 3. The DB is transmitted during the Discovery Time (DT), while the announcement beacons/frames are transmitted during the Announcement Time (AT) 210. The Data Transfer Time (DTT) 320 is used for the actual data communications amongst STAs which are part of the network, the Association Beamforming Training (A-BFT) 310 is used for beamforming training of a new STA 305 attempting association with the high frequency wireless network 140, and a Beamforming Training Time (BFTT) 325 is for beamforming amongst STAs such as mobile stations 110a and 110b that are already associated with the high frequency wireless network 140.

Since the DB is less efficient than the AB (since it is transmitted in omni mode), it does not need to be transmitted in every beacon interval. One of the primary purposes of the DB and AB is synchronization. Hence, a STA must receive either the discovery beacon or announcement beacon/frame to be considered synchronized. If a STA misses a consecutive number of beacons from the PCP, it is considered not synchronized. In this case, the STA shall stop transmissions during the DTT and must restart a PBSS joining procedure.

While the DB is sent in omni mode 330, 335 (Omni/Dir is shown at 340) with the intention to be received by all of a PCP's neighbors, the announcement frame/beacon is a high-rate transmitted only to a subset of the beamformed and, most of the time, associated STAs. This allows the PCP flexibility in balancing aspects such as discovery latency and performance. Announcement beacons are also more conducive to better spatial reusability since these beacons are always transmitted in beamformed mode, and provide better efficiency when the number of supported antenna elements is higher than the number of STAs associated with the PCP.

Figure 4:
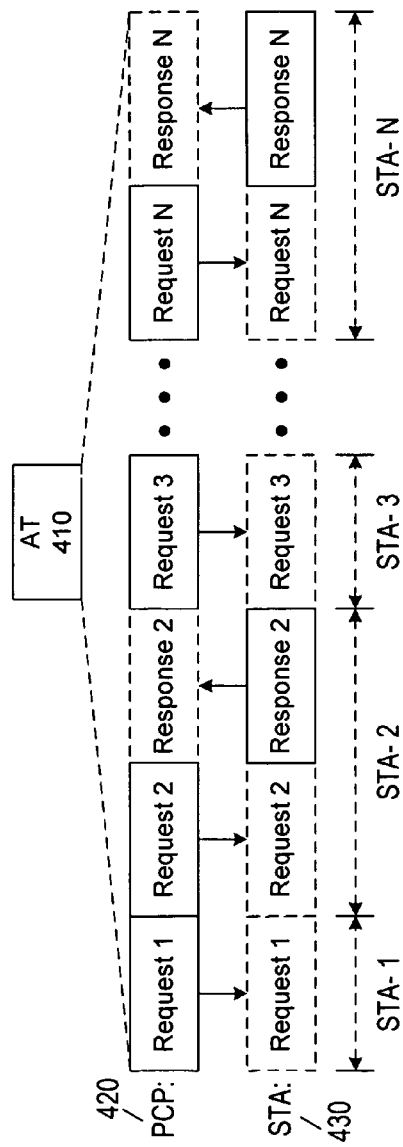
FIG. 4 is an illustration of a structure of the AB period (AT) according to embodiments of the present invention.

FIG. 4 is an illustration of a structure of the AB period (AT) 410 where AB frames are exchanged. Each Request frame shown in FIG. 4 is a general name for an AB frame, and could be, for example, replaced by any of the management frames present in IEEE 802.11. The Request frame is a unicast and directed frame addressed to a particular STA and carries, for example and not by way of limitation, the channel time scheduling of the network. For each Request frame, there must be a response from the addressed receiver. This response may be a management frame (e.g., association request, channel time allocation request) or, if there is no management frame to be transmitted, simply an ACK.

Because for each Request there is a Response frame, this allows the PCP 420 and STA 430 to monitor and maintain the beamformed link between them. If the PCP 420 does not receive a response frame after it transmits a request frame to a STA 430, it may conclude that the link is no longer valid and may reschedule the beamforming between the PCP 420 and the affected STA 430.

Multiple Request/Response frame exchanges can take place during the AT 410. Also, Request and Response transmissions between the PCP 420 and a STA 430 may occur more than once over the same AT 410.

To minimize overhead associated with omni transmissions, information carried in DB is kept to a minimum and may include the PCP ID, timing information, number of beacon transmissions left (in case of directional beacons), etc. In contrast, since it is transmitted in high-rate, the announcement beacon/frame contains all the necessary information required to make the network function, such as channel scheduling, control and management information, PBSS synchronization information, etc.

To improve efficiency, DBs may not be present in every beacon interval 300. If DBs are used infrequently, then the PBSS performance can be substantially improved since less overhead will be paid in using low-rate omni transmissions.

If a PCP 420 wants to serve multiple associated STAs 430 in a beacon interval 300, the PCP 420 can transmit multiple announcement frames/beacons during the AT period of that beacon interval 300. The announcement beacon contains the beacon interval 300 time allocation including when the PCP 420 will be ready to receive from and/or transmit to the STA 430. This allows STAs 430 who receive an announcement frame/beacon to synchronize their schedule with that of the PCP 420. Finally, for STAs that are in power save mode, the PCP 420 does not send them announcement beacon/frames.

Figure 5:
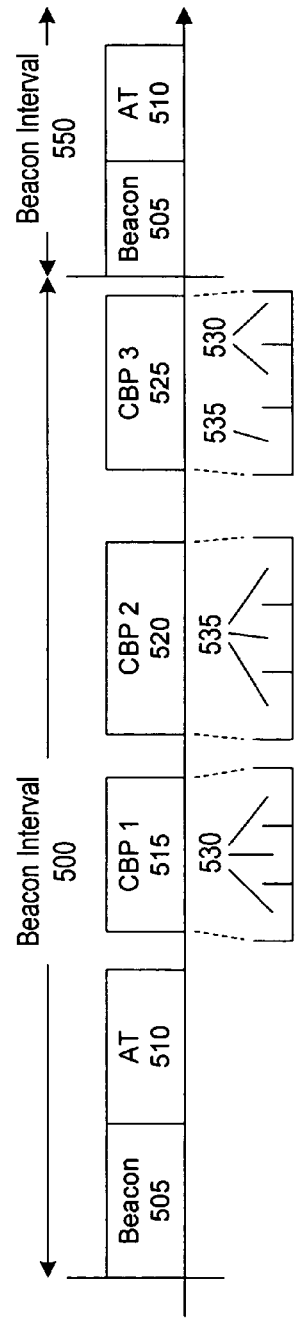
FIG. 5 is an illustration of successive beacon intervals having contention-based periods which can be configured with varying slot sizes and contention windows according to embodiments of the invention.

FIG. 5 is an illustration of successive beacon intervals including a first beacon interval 500 and a second beacon interval 550 having contention-based periods with configurable slot sizes and minimum/maximum contention windows according to embodiments of the invention. In this embodiment, a STA such as the mobile station 110a of FIG. 1 is powered on and the STA listens for a signal from an access point 100 or a mobile station 110. The STA may then become a PCP and transmit the first beacon interval 500 having scheduled contention-based periods such as CBP1 515, CBP2 520, and CBP3 525. Scheduling information for the contention-based periods is announced in the beacon 505 and/or the AT 510, wherein the scheduling information includes slot size information. In this embodiment, there are two slot sizes corresponding to PCP-centric slots 530 and Distributed slots 535 as defined by:

PCP-centric: aSlotTime=aPropDriftMargin+aShort-TRTSDur+aSIFSTime+aCCATime+aRxTxSwitchTime Distributed: aSlotTime=aCCATime+aPropDriftMargin+aRxTxSwitchTime+aMACProcessing Delay The contention-based periods are slotted and the duration of each contention-based period is an integral multiple of the slot times in each contention-based period. A contention window may change as a function of a number of devices such as STAs and APs in the wireless network 140 and a number of collisions detected in the wireless network 140. For example, the contention window may have contention window values including a contention window minimum and a contention window maximum wherein boundaries of the contention window have a wide separation between the minimum and maximum when there are multiple collisions in the network 140. Alternately, the contention window may be narrow if there are few collisions in the network 140.

A station such as the mobile station 110 may carry a contention window over from a first contention-based period to a subsequent or next contention-based period in the same beacon interval 500 or a second beacon interval 550. In an embodiment, the STA initiates beamforming in a first contention-based period such as CBP1 515 and continues the beamforming in a second contention-based period such as CBP2 520 without performing CSMA/CA access in the second contention-based period.

Alternately, if the station gets a small contention window, it can access the same contention-based period multiple times. Additionally, the minimum contention window, the maximum contention window, and the size of each slot in the plurality of slots is configurable based on PCP-centric CSMA/CA and distributed CSMA/CA protocols, though the embodiment is not so limited. For example, a first slot in the plurality of slots of the contention-based period may be configured based on the PCP-centric CSMA/CA protocol and a second slot in the plurality of slots is configured on the distributed CSMA/CA protocol. Further, the size of each slot may be configured based on how request to send (RTS) and clear to send (CTS) transmissions are accomplished.

In addition, the slot size may also be impacted by an antenna capability of a transmitting device and a receiving device. As an example, a request to send (RTS) signal and a clear to send (CTS) signal may be exchanged between STAs using multiple directional transmissions or a single quasi-omni transmission. The manner in which the RTS and CTS signals are sent and received can impact the slot size. A STA may transmit a series of beacon intervals including the first beacon interval 500 followed by a second beacon interval 550, each comprising a beacon 505, AT 510, contention-based periods and service periods (not shown). In an embodiment, a STA may not complete transmission before the end of a contention-based period such as CBP1 515 and may continue to transmit in a subsequent contention-based period such as CBP2 520 and/or CBP3 525. For example, a plurality of STAs may be time synchronized using a series of contention-based periods because a beamforming process may take more than one contention-based period to complete.

Figure 6:
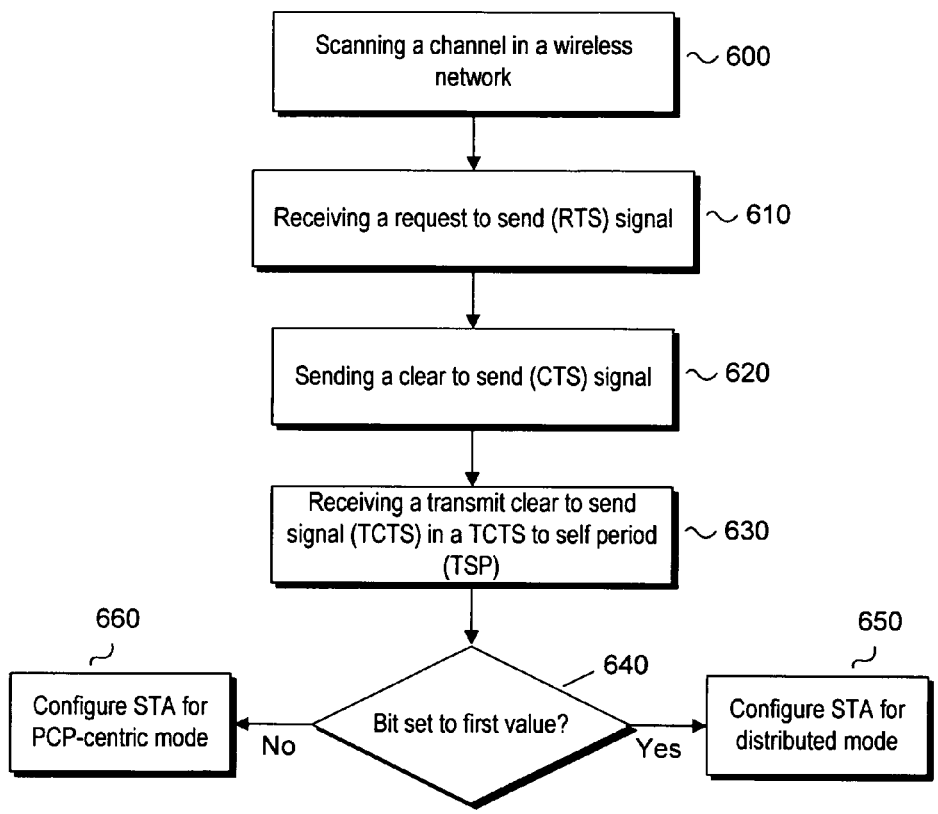
FIG. 6 is a flowchart describing a method for wireless communication according to embodiments of the invention.

FIG. 6 is a flowchart describing a method for wireless communication according to embodiments of the invention. In element 600, a STA such as mobile station 110*a* scans for one or more channels in the wireless network 140 to determine if one or more other devices are present. One or more access points or STAs may be present in the wireless network 140. The mobile station 110*a* receives a request to send (RTS) 610 in an owner access period (OAP) of a contention-based period (CBP) from another device such as mobile station 110*b*. The mobile station 110*a* sends a clear to send (CTS) signal in element 620 to the mobile station 110*b*. Alternately, the mobile station 110*a* sends a CTS to the mobile station 110*b* and a device that serves as the PCP for the wireless network 140.

The mobile station 110*a* receives a transmit clear to send signal (TCTS) in a TCTS to-self period (TSP) in element 630. If the mobile station 110*a* receives the TCTS with a bit set to a first value in element 640, the STA is then configured for distributed mode in element 650. As an example, if the STA receives the TCTS with the bit set at zero in a duration field, the STA is then configured for distributed mode. In another embodiment, the bit may be set at a non-zero value in the duration field and the STA is then configured for distributed mode. Alternately, the bit is not set to a first value and the STA is configured for PCP-centric mode in element 660. As an example, if the STA receives the TCTS with the bit set at a non-zero in a duration field, the STA is then configured for distributed PCP-centric mode. In another embodiment, the bit may be set at zero in the duration field and the STA is then configured for PCP-centric mode.

If during the TSP the STA does not receive a TCTS, the STA shall use the distributed mode for access if, for example, a PCP Active Field is set to zero in a PBSS schedule information element (IE). Further, the STA shall not transmit if the PCP Active Field is set to one in the PBSS schedule IE.

Embodiments may be described herein with reference to data such as instructions, functions, procedures, data structures, application programs, configuration settings, etc. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a STA, provides wireless communication over contention-based periods having configurable slot sizes and minimum/maximum contention windows. The programs in the STA may be considered components of a software environment.

The operation discussed herein may be generally facilitated via execution of appropriate firmware or software embodied as code instructions on a host processor of the STA, as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A method, comprising:
communicating in a wireless network by a station (STA) having a media access control (MAC) layer that transmits data in a multiple-level beacon interval, comprising a contention-based period and at least a first discovery beacon and a second announcement beacon, the first discovery beacon arranged to be selectively transmitted omni-directionally at a first rate during discovery time which is used during actual communication among all STAs in a personal basic service set (PBSS) and the second announcement beacon arranged to be transmitted directionally at a second, higher rate to other personal basic service set (PBSS) STAs that are associated with the STA, to allow access to the wireless network using a carrier sense multiple access with collision avoidance (CSMA/CA) protocol, wherein scheduling information for the contention-based period is transmitted in the multiple-level beacon interval prior to the contention-based period and wherein the contention-based period comprises a plurality of slots and a size of each slot in the plurality of slots is configurable, wherein either the first discovery beacon or the second announcement beacon is used for synchronizing the other PBSS STAs with the STA; and
configuring the size of each slot in the plurality of slots based on whether request to send (RTS) and clear to send (CTS) transmissions are accomplished using multiple directional transmissions or a single quasi-omni transmission;
wherein minimum and maximum contention windows for each contention-based period are configurable and wherein the STA serves as a personal basic service set (PBSS) control point (PCP) or access point (AP) and the STA chooses minimum and maximum contention window values based on a number of collisions detected in the wireless network or a number of associated stations in the wireless network.

2. The method of claim 1, wherein the STA serves as a personal basic service set (PBSS) control point (PCP) or access point (AP) to schedule time in the beacon interval for communicating with the STA and wherein scheduling information for the contention-based period is transmitted in a beacon or an announcement time (AT) of the beacon interval.

3. The method of claim 1, further including transmitting a service period wherein the STA controls access to the wireless network during a duration of the service period.

4. The method of claim 1, wherein minimum and maximum contention windows and the size of each slot in the plurality of slots is configurable based on PCP-centric CSMA/CA and distributed CSMA/CA protocols.

5. The method of claim 4, wherein a first slot in the plurality of slots of the contention-based period is configured based on the PCP-centric CSMA/CA protocol and a second slot in the plurality of slots is configured based on the distributed CSMA/CA protocol.

6. The method of claim 1, further comprising transmitting timing data over the first beacon and channel scheduling data over the second beacon of the multiple level beacon interval.

7. The method of claim 6, wherein the STA initiates beamforming in the contention-based period and continues the beamforming in a second contention-based period without performing CSMA/CA access in the second contention-based period.

8. A method, comprising:
transmitting in a wireless network by a station (STA) having a media access control (MAC) layer that transmits data in a multiple-level beacon interval, the multiple-level beacon interval comprising a contention-based period and at least a first discovery beacon and a second announcement beacon, the first discovery beacon arranged to be selectively transmitted omni-directionally at a first rate during discovery time which is used during actual communication among all STAs in a personal basic service set (PBSS) and the second announcement beacon arranged to be transmitted directionally at a second, higher rate to other personal basic service set (PBSS) STAs that are associated with the STA, to allow access to the wireless network using a carrier sense multiple access with collision avoidance (CSMA/CA) protocol, wherein either the first discovery beacon or the second announcement beacon is used for synchronizing the other PBSS STAs with the STA, and wherein the transmitting comprises transmitting scheduling information for the contention-based period in the multiple-level beacon interval prior to the contention-based period;
receiving a request to send (RTS) signal by the STA in the wireless network;
sending a clear to send (CTS) signal from the STA;
configuring the STA for distributed mode when a transmit clear to send (TCTS) signal is received during a TCTS to self period (TSP) with a bit set to a first value;
configuring the STA for PCP-centric mode when the TCTS signal is received during the TSP with the bit set to a second value;
configuring the STA for distributed mode when a TCTS signal is not received during the TSP; and
refraining from transmitting by the STA when the bit is set to a third value;
wherein minimum and maximum contention windows for each contention-based period are configurable and wherein the STA serves as a personal basic service set (PBSS) control point (PCP) or access point (AP) and the STA chooses minimum and maximum contention window values based on a number of collisions detected in the wireless network or a number of associated stations in the wireless network.

9. The method of claim 8, further comprising receiving an information element (IE) bit and configuring the STA for distributed mode if the IE bit is set to zero.

10. The method of claim 8, further comprising receiving an information element (IE) bit and configuring the STA for distributed mode if the IE bit is set to one.

11. An apparatus, comprising:
a station (STA) having a transceiver adapted to communicate in a wireless network with a MAC layer that transmits data in a multiple-level beacon interval comprising at least a first discovery beacon and a second announcement beacon, the first discovery beacon arranged to be selectively transmitted omni-directionally at a first rate during discovery time which is used during actual communication among all STAs in a personal basic service set (PBSS) and the second announcement beacon arranged to be transmitted directionally at a second, higher rate to other personal basic service set (PBSS) STAs that are associated with the STA,
wherein the beacon interval comprises a contention-based period to allow access to the wireless network using a carrier sense multiple access with collision avoidance (CSMA/CA) protocol, wherein scheduling information for the contention-based period is transmitted in the beacon interval prior to the contention-based period and wherein the contention-based period comprises a plurality of slots and a size of each slot in the plurality of slots is configurable, wherein either the first discovery beacon or the second announcement beacon is used for synchronizing the other PBSS STAs with the STA, and wherein the size of each slot in the plurality of slots is configured based on whether request to send (RTS) and clear to send (CTS) transmissions are accomplished using multiple directional transmissions or a single quasi-omni transmission;

wherein minimum and maximum contention windows for each contention-based period are configurable and wherein the STA serves as a personal basic service set (PBSS) control point (PCP) or access point (AP) and the STA chooses minimum and maximum contention window values based on a number of collisions detected in the wireless network or a number of associated stations in the wireless network.

12. The apparatus of claim 11, wherein the STA serves as a personal basic service set (PBSS) control point (PCP) or access point (AP) to schedule time in the beacon interval for communicating with the STA and wherein scheduling information for the contention-based period is transmitted in a beacon or an announcement time (AT) of the beacon interval.

13. The apparatus of claim 11, wherein minimum and maximum contention windows and the size of each slot in the plurality of slots is configurable based on PCP-centric CSMA/CA and distributed CSMA/CA protocols.

14. The apparatus of claim 13, wherein a first slot in the plurality of slots of the contention-based period is configured based on the PCP-centric CSMA/CA protocol and a second slot in the plurality of slots is configured based on the distributed CSMA/CA protocol.

15. The apparatus of claim 11, further comprising transmitting the data over a second beacon interval.

16. The method of claim 15, wherein the STA initiates beamforming in the contention-based period and continues the beamforming in a second contention-based period without performing CSMA/CA access in the second contention-based period.

* * * * *